United States Patent Office 3,418,203
Patented Dec. 24, 1968

3,418,203
PROCESS OF FORMING WATER-LAID PRODUCTS OF CELLULOSIC FIBERS AND GLASS FIBER CONTAINING LIGNO-SULFONIC ACID AND SODIUM SILICATE AND PRODUCTS THEREOF
Saara K. Asunmaa, Laguna Beach, Calif., assignor to Owens-Illinois, Inc., a corporation of Ohio
No Drawing. Filed Sept. 7, 1965, Ser. No. 485,599
5 Claims. (Cl. 162—145)

ABSTRACT OF THE DISCLOSURE

A method of making products from aqueous homogeneous mixtures of cellulosic pulp fibers and finely divided glass solids by mixing therewith a solution of ligno-sulfonic acid and sodium silicate, agitating the mixture to form a homogeneous dispersion and removing the major portion of the aqueous phase and shaping the resulting mass with heat and pressure.

---

The present invention relates to a method for making pulp compositions and articles formed therefrom. More particularly, the present invention relates to an improved method for bonding cellulosic pulp fibers and glass in various forms to obtain glass-pulp compositions of improved characteristics which are particularly valuable for the formation of laminated products such as glass paper. Many different shaped laminated paper products can be obtained according to the present invention which are useful as packaging materials including sheets, liners and the like.

Heretofore, only a limited number of materials have been used for binding agents in the preparation of glass-pulp fiber compositions. One of the principal difficulties encountered in the past has been to obtain good adhesion between glass and pulp fibers. Because of the differences in the nature of the glass and the pulp, many conventional materials suitable as adhesive agents when bonding a plurality of identical materials have not proved to be successful when used with dissimilar combinations, particularly when bonding organic and inorganic materials together.

Accordingly, it is an object of the present invention to provide novel pulp compositions having desirable properties making them suitable for many purposes.

It is a further object of the present invention to provide a method for producing pulp compositions and pulp bodies having desirable properties and characteristics.

It is a further object of the present invention to provide an improved method for making glass-pulp compositions having improved adhesion between the glass and pulp fibers.

It is a further object of the present invnetion to provide improved bonding between glass fibers and pulp fibers in order to produce a laminated product of glass and pulp fibers.

It is a further object of the present invention to provide shaped glass-pulp bodies of improved properties which overcome the disadvantages of prior known compositions and methods.

It is a further object of the present invention to provide improved glass-pulp compositions having improved adhesion between the glass fibers and pulp fibers.

It is a further object of the present invention to provide a method for making shaped glass-containing pulp laminates.

In achieving the above objects, one feature of the present invention resides in forming an aqueous slurry comprising cellulosic pulp fibers and glass in the form of fibers, flakes, and the like and adding thereto a high molecular weight organic acid having a plurality of —$SO_3H$ and —$COOH$ groups and salts thereof under conditions whereby the acidic component reacts with available hydroxyl groups of the celluosic pulp fibers and with the glass surfaces to bond said fibers together producing a glass-containing pulp composition of improved strength properties.

A further feature of the present invention resides in forming an aqueous slurry comprising cellulosic pulp fibers and up to about 50% by weight based on the dry materials, of glass in various forms such as fibers, flakes, chips and the like, and adding thereto a high molecular weight organic acid selected from the group consisting of lignosulfonic acids and azophthalocyaninesulfonic acids under conditions whereby the said acid reacts with the available hydroxyl groups on the cellulosic pulp fibers and with the activated groups on the glass surfaces to bond the said cellulosic fibers and the glass together forming a glass-containing pulp composition. Upon removal of at least a major proportion of the aqueous phase the pulp composition can be shaped and formed into a laminated article such as a sheet according to any desired configuration.

The above objects and features as well as other objects, features and advantages of the present invention will become apparent from the following detailed description thereof.

In carrying out the present invention the cellulosic pulp fibers are mixed with the organic acid under such conditions as to achieve good contact and adequate treatment. Most conveniently, this can be carried out by preparing a suspension of the fibers in a liquid, preferably water. Finely divided glass fibers can then be introduced into the aqueous slurry by any suitable means. Alternatively, a slurry of the pulp can be mixed with a slurry containing the finely divided glass.

Thereafter, the high molecular weight organic acid having a plurality of —$OSO_3H$ and —$COOH$ groups attached to the molecule is added to the aqueous slurry. Agitation is carried out so as to homogeneously disperse the organic acid in the aqueous slurry so as to promote adequate contact of the cellulosic pulp fibers and the glass fibers, flakes or chips, etc. with the high molecular weight acid. It is believed that under the conditions of the described process, the acid reacts with the available hydroxyl groups of cellulosic pulp fibers as well as reacts with the glass fiber surfaces.

After a sufficient amount of time, the pulp slurry is then treated so as to remove at least a major portion of the aqueous phase to obtain the pulp glass composition. Thereafter, the composition can be shaped in any desired configuration and formed into a laminated product.

Under the preferred conditions of the present conditions, a slurry is formed of a mixture of cellulosic pulp fibers and up to about 50% by weight of glass fibers which is agitated to obtain a homogeneous mixture. The organic acid is then introduced into the slurry and agitation is continued to uniformly disperse acid throughout the aqueous mixture. The agitation step insures good contact with the cellulosic fiber surfaces and the glass fiber surfaces. Under the conditions of the reaction it is believed that the acidic groups of the organic acid react with available hydroxyl groups of the cellulosic pulp fibers as well as hydroxyl groups present in the surface of the glass fibers. The organic acid thus represents a means for bonding the two types of fibers by a chemical reaction.

To form the final product, tthe aqueous phase is substantially removed by filtration, decantation or the like during or after which the pulp composition can be shaped and formed into the desired product. The final formation can take place with heat and pressure, heat or pressure as may be necessary to achieve the resulting formed article.

Various cellulosic pulp fibers can be utilized according to the present invention including hardwood, softwood and ground wood pulps which are particularly suitable. Mixtures of various cellulosic pulps are also contemplated. Generally, the celulosic pulps are available in the form of aqueous slurries. It is to be understood, however, that other liquid mediums for the pulp can be utilized.

Glass in various forms such as fibers, flakes, scrim, chips and the like can be added to the cellulosic pulp slurry in the dry state or they can be previously suspended in an aqueous medium and the aqueous slurry added to the pulp slurry, which ever is more convenient.

The high molecular weight organic acid utilized according to the purposes of the present invention contain a plurality of at least two acidic groups selected from the groups consisting of —$SO_3H$, —COOH, mixtures thereof and alkali metal salts thereof. Generally, the most suitable organic acids found for purposes of the present invention are lignosulfonic acids and azophthalocyaninesulfonic acids. The alkali metal (e.g., Li, K, Na) salts of these acids are also suitable for practice of the aforementioned process. Generally, from about 0.5% to about 20% of the acid may be added based on the dry weight of the solids content. However, it is understood that these amounts can be varied.

During the agitation and reaction of the acid or salt thereof with the hydroxyl groups of the fibers, the pH is generally maintained between 4 to about 6. Therefore, sufficient acid is introduced into the slurry system to maintain the pH at the values indicated above.

Upon introducing the acid into the slurry, vigorous agitation is employed so as to achieve adequate contacting of the pulp fiber surfaces with the acid. Thereafter, the homogeneously mixed composition is concentrated by removing the bulk of the aqueous phase by mechanical means such as filtration, decantation to recover the wet homogeneous admixture of treated pulp fibers.

Among the high molecular weight organic acids suitable for practice of the present invention are those represented by the structure:

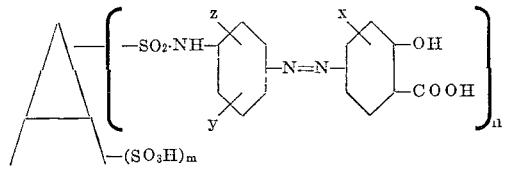

in which A represents a substituted or unsubstituted metaliferous phthalocyanine molecule in which —$SO_2 \cdot NH$ or —$SO_3H$ groups are present in the 3- or 4-position, wherein $m$ is 0 to 3, $n$ is 1 to 4 and $m+n$ is 4, and wherein $x$ is hydrogen, a halogen atom or a methyl, hydroxyl, nitro or sulfonic acid group, $y$ represents a hydrogen atom, a halogen atom or an alkyl, alkoxy, nitro, sulfonic acid or carboxycyclic acid group, and $z$ is a hydrogen atom, a halogen atom, or an alkyl or alkoxy group, and the $SO_2 \cdot NH$— group occupies a metal- or para-position relating to the azo linkage.

It is believed, based on present knowledge, that a two-stage reaction takes place during the reaction and subsequent steps between the large sulfonic acid molecules and the adjacent functional groups that are on the cellulosic pulp fibers and those of the glass surfaces to promote the bonding over considerable distances. The acid, it is thought, acts as a binder between the components which contain two different types of functional groups. Under certain circumstances this type of reaction is referred to as "chemisorption." The reaction of cellulosic carboxyls and the salts of sulfonic acid is in the nature of an ion exchange reaction and exhibits such a high affinity that a strong adhesion of the sulfonic acid molecules on the cellulose fiber is obtained even without the preceding exchange of the cellulose carboxyl cation to hydrogen as required by many other exchange reactions. An adhesion to the glass fiber surfaces containing hydroxyls is obtained either as hydrogen bonds between hydroxyls of glass and those of the pulp itself or between hydroxyls of the glass and those of the wood sugars adhered to the pulps and to the lignosulfonic acids. Azo-phthalocyanine dyestuffs adhere strongly to the surface of oxidic protective coatings on aluminum. The $Al_2O_3$ suface contains OH— groups which promote adhesion.

According to a further aspect of the present invention, sodium silicate is added to the organic acid prior to the contacting with the pulp to promote structural adhesive bonding. Generally, a 3% solution of sodium silicate will be effective although the amount can range from 0.5% to 10% by weight. It is to be understood that this range can be varied as desired. Generally, an excess of the organic acid is used to neutralize the alkali present in the sodium silicate.

Although the foregoing description emphasizes the use of the organic acids added to the pulp slurry, improved properties can also be obtained by spraying formed pulp bodies with the organic acid. Generally, the pulp compositions which can be in any form, such as a sheet, are sprayed with a solution containing the acid and then pressed and dried to achieve satisfactory results. Preferred conditions include pressing the treated pulp body at about 150 p.s.i. for at least about 5 minutes and drying the pulp body at about 250° F. A drum drier may be conveniently used for those purpose.

The following examples serve to illustrate the present invention but are not considered limiting thereof in any manner.

Example I

Fifteen handsheets were used in testing the suitability of selected organic acids for improving the properties of pulp bodies in accordance with the invention described herein. The handsheets were prepared from a cellulosic wood pulp known in the pulp industry as Tomahawk pulp. Handsheets numbered 1 through 5 were sprayed evenly on both sides with 60 ml. of a 3% sodium silicate solution to which was added a solution of lignosulfonic acid containing several —$SO_3H$ groups in the molecule (Orzan A).

The acid solution was prepared by mixing 2000 mg. of the acid (Orzan A) to 100 ml. distilled water. To obtain a neutral solution 3.6 gms. of Orzan A were required for every gram of sodium silicate.

Handsheets numbered 6 through 10 were sprayed evenly on both sides with 55 ml. of a solution containing 19.2 grams of the identical lignosulfonic acid (Orzan A) in 100 grams of distilled water.

The above treated handsheets 1 through 10 were pressed at 150 p.s.i. for 5 minutes and then dried in a drum drier at 250° F.

The remaining hand sheets numbered 11 through 15 were not treated and kept for controls.

The following table shows a comparison of the strength of the handsheets as determined by the standard Ring Crush test. Specimens 1 through 10 treated in accordance with the present invention showed an improvement of considerable magnitude when compared with the untreated controls (11–15).

TABLE I

| | Sheet No. | Basis wt. | Tactor correction | Gram wt. | Caliper | Ring crush |
|---|---|---|---|---|---|---|
| Treated with acid and Na silicate. | 1 | 32.6 | .79754 | 5.93 | 9.65 | 67.8 |
| | 2 | 32.9 | .79027 | 5.98 | 10.19 | 68.7 |
| | 3 | 32.2 | .80745 | 5.85 | 10.2 | 70.2 |
| | 4 | 32.1 | .80996 | 5.83 | 10.4 | 65.6 |
| | 5 | 33.3 | .78078 | 6.06 | 10.2 | 74.0 |
| Test average | | 32.6 | | 5.93 | 10.1 | 69.3 |
| Treated with acid | 6 | 32.4 | .80246 | 5.89 | 9.95 | 71.4 |
| | 7 | 31.4 | .82802 | 5.71 | 10.18 | 67.1 |
| | 8 | 31.4 | .82802 | 5.71 | 10.27 | 65.4 |
| | 9 | 31.6 | .82278 | 5.95 | 9.87 | 72.4 |
| | 10 | 32.4 | .80246 | 5.89 | 9.39 | 72.2 |
| Test average | | 31.8 | | 5.79 | 9.9 | 69.7 |
| Control | 11 | 27.1 | .95940 | 4.92 | 10.94 | 48.9 |
| | 12 | 26.6 | .97744 | 4.84 | 11.53 | 54.7 |
| | 13 | 26.7 | .97378 | 4.86 | 11.39 | 51.6 |
| | 14 | 26.9 | .96654 | 4.89 | 11.60 | 53.2 |
| | 15 | 27.1 | .95940 | 4.92 | 10.94 | 54.7 |
| Test average | | 26.8 | | 4.89 | 11.5 | 52.6 |

Example II

Fifteen handsheets were made using the Tomahawk pulp employed in Example I.

Handsheets numbered 1 through 5 were sprayed evenly on both sides with 73 ml. of a 3% sodium silicate solution which had been neutralized with a lignosulfonic acid (Orzan A) to provide 1.2 grams of acid per 10 ml. sodium silicate solution.

Handsheets numbered 6 through 10 were sprayed evenly on both sides with 56 ml. of lignosulfonic acid solution containing 1.2 grams of acid per 10 ml. solution (Orzan A).

All handsheets were pressed at 150 p.s.i. for 5 minutes and dried at 250° F. on a drum drier.

The remaining five sheets numbered 10 through 15 were controls.

The handsheets were then conditioned in the humidity room prior to testing.

The following table shows that improvements were obtained in Ring Crush, Mullen and Tensile Strength Tests, which were performed according to standard procedures.

TABLE II

| | Sheet No. | Basis wt. | Gram wt. | Ring Crush | Mullen | | Tensile |
|---|---|---|---|---|---|---|---|
| Sodium silicate and acid | 1 | | 5.7 | 98 | 44 | 42 | 35 |
| | 2 | | 5.7 | 95 | 41 | 41 | 33 |
| | 3 | | 5.7 | 88 | 42 | 40 | 34 |
| | 4 | Δ 5.9 | 5.8 | 83 | 43 | 41 | 35 |
| | 5 | 31.4 | 5.7 | 85 | 42 | 42 | 33 |
| Ligno-sulfonic acid | 6 | | 5.1 | 85 | 42 | 46 | 35 |
| | 7 | | 5.5 | 88 | 44 | 44 | 36 |
| | 8 | | 5.5 | 88 | 42 | 41 | 35 |
| | 9 | Δ 3.8 | 5.5 | 88 | 42 | 40 | 36 |
| | 10 | 30.3 | 5.5 | 88 | 41 | 43 | 34 |
| Control | 11 | | 4.8 | 49 | 40 | 38 | 29 |
| | 12 | | 4.8 | 52 | 40 | 39 | 28 |
| | 13 | | 4.8 | 53 | 37 | 35 | 29 |
| | 14 | | 4.8 | 55 | 39 | 38 | 28 |
| | 15 | 26.5 | 4.8 | 52 | 40 | 38 | 29 |

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A method of making a glass-pulp shaped product which comprises forming an aqueous homogeneous mixture of cellulosic pulp fibers and finely divided glass solids and mixing therewith a solution of lignosulfonic acid or alkali metal salts thereof, said solution further containing sodium silicate in an amount of from 0.5% to 10% by weight, said acid being present in an amount sufficient to neutralize the sodium silicate, agitating the mixture to obtain a homogeneous dispersion of the said organic acid in the pulp mixture and to react the functional groups of the said organic acid with the pulp and glass surfaces to thereby bond the pulp and glass surfaces together, thereafter removing a major portion of the aqueous phase and shaping the mass with heat and pressure to obtain a glass-pulp shaped product having improved properties.

2. A method of forming a glass-pulp sheet which comprises forming a homogeneous aqueous mixture of cellulosic fibers and glass fibers, and dispersing therein a solution of lignosulfonic acid or alkali metal salts thereof, and said acid being present in an amount ranging from 0.5 to 20% by weight based on the weight of dry solids, said solution further containing 0.5 to 10% by weight sodium silicate, with sufficient agitation to obtain a homogeneous dispersion of the acid component in the fiber mixture and to react the functional groups of the acidic component with the available hydroxyl groups of the cellulosic fibers and with the glass fibers, thereafter removing at least a major portion of the aqueous phase of the mixture, and shaping the mixture so as to obtain a sheet with improved strength characteristics.

3. A method of making a glass-pulp product which comprises forming a homogeneous mixture of pulp fibers and glass fibers suspended in an aqueous medium, wherein the glass is present in an amount up to about 50% by weight of the total, adding to said mixture, from about 0.5% to 20% by weight of a solution of lignosulfonic acid or alkali metal salts thereof and in an amount sufficient to provide a pH of from 4 to 6 in the aqueous mixture, said solution containing 0.5 to 10% by weight sodium silicate, agitating the mixture to homogeneously disperse the acid through the glass-pulp mixture and to permit the acid to react with the available hydroxyl groups of the pulp fibers and to react with activation sites on the glass fiber surfaces, thereafter removing substantially all of the aqueous phase of the mixture to obtain the glass-pulp product.

4. A method as defined in claim 3 wherein the treated composition is shaped and pressed at 150 p.s.i. for about 5 minutes and dried at 250° F. on a drum dryer.

5. A glass-pulp sheet having been made by treating a homogeneous mixture of pulp fibers and glass fibers with a solution of lignosulfonic acid or alkali metal salts of said acids, said solution containing from 0.5% to 10% by weight sodium silicate, said acid being present in an amount sufficient to neutralize the sodium silicate, and forming the sheet from the glass-pulp mixture.

References Cited

UNITED STATES PATENTS

| | | | |
|---|---|---|---|
| 3,158,532 | 11/1964 | Pall et al. | 162—145 X |
| 3,180,787 | 4/1965 | Adams | 162—163 |
| 3,236,719 | 2/1966 | Waggoner | 162—145 |
| 3,336,185 | 8/1967 | Helbing | 162—163 X |

S. LEON BASHORE, *Primary Examiner.*

U.S. Cl. X.R.

162—162, 163, 156